United States Patent [19]

Frank

[11] 3,911,959

[45] Oct. 14, 1975

[54] EARLY-WARNING HOSE

[76] Inventor: Eugene P. Frank, 13260 Findlay Ave., Apple Valley, Minn. 55124

[22] Filed: June 21, 1974

[21] Appl. No.: 481,905

[52] U.S. Cl. .................. 138/36; 138/137; 138/148
[51] Int. Cl.² .................. F16L 55/00; F16L 11/12
[58] Field of Search ............ 138/36, 114, 137, 148, 138/177–178

[56] References Cited
UNITED STATES PATENTS
| | | | |
|---|---|---|---|
| 2,503,033 | 4/1950 | Engelmann | 138/178 X |
| 2,995,151 | 8/1961 | Lockwood | 138/177 X |
| 3,299,417 | 1/1967 | Lebthorpe | 138/114 X |

*Primary Examiner*—John W. Huckert
*Assistant Examiner*—Charles Gorenstein

[57] ABSTRACT

Early-warning hose comprising a water-absorbent layer sandwhiched between an inner hose and a transparent or translucent outer hose so that any liquid leaking from the inner hose permeates the absorbing layer and may be observed because of the transparency or translucency of the outer hose, for experimental purposes, said early-warning hose being clamped to an open tube at the top, and a closed tube at the bottom, filled with water and the inner hose punctured.

2 Claims, 5 Drawing Figures

EARLY-WARNING HOSE

SUMMARY

My invention, the early-warning hose, relates in general to the well known hose, a flexible tube used to carry water or other liquids. To be specific, my invention relates to the three-ply hose consisting of a reinforcing ply sandwiched between two flexible tubes-all bonded together. To be more specific, my invention relates to a three-ply hose made of transparent or translucent material which is known in the arts.

I have found a new use for a three-ply transparent hose. Not only is my invention used as an ordinary hose, but it also serves as an early warning indicator of a particial break in said hose if such break occurs.

The heart of the invention is the provision for the seepage of water within the middle ply as this ply is purposely made water or liquid absorbing. This is novel as in the art of hose making, the plys are well bonded together with no such provision.

The transparent outer ply is not new or its use as a window is not new, but its use as a window to the middle ply (or the space between the inner ply and the outer ply) is a new use of a transparent outer ply. as a window. The inner ply of my invention may be opaque so that the outer ply functions even better as a window as the window is used to view liquid leaking to the middle ply.

If the inner ply of the known transparent hose were opaque, the outer ply would not function as a window to view the liquid the hose is carrying.

Figure 1:
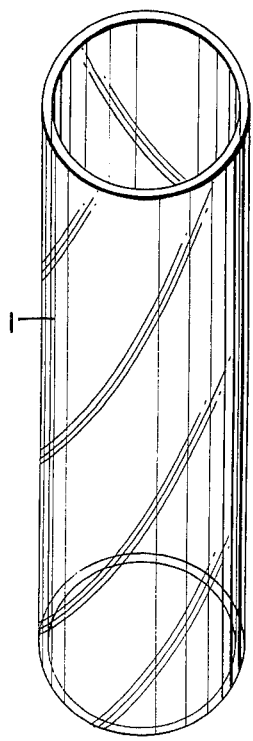
FIG. 1 represents the outer hose. It is made of transparent material suitable for hose construction, that is - transparent hose material.
Figure 2:
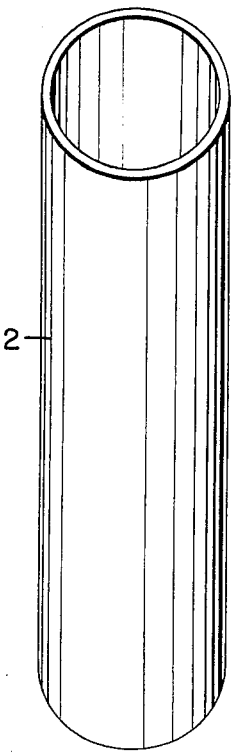
FIG. 2 represents the water or liquid absorbent material forming the middle ply of my invention. Its represented as a tube as it takes the same shape as the inner and outer hose.
Figure 3:
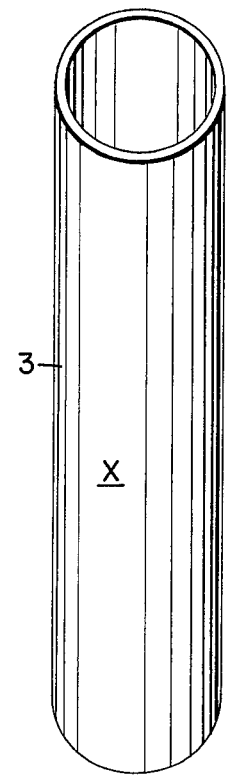
FIG. 3 represents the inner hose. Since it may be opaque as well as transparent, it may be made of any suitable hose material.
Figure 4:
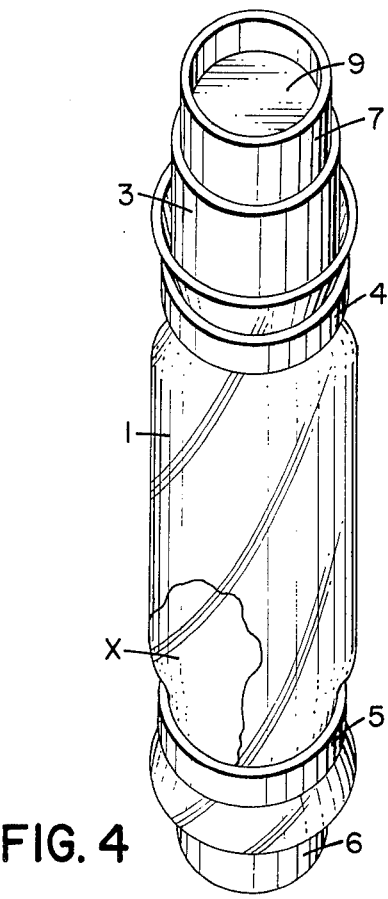
FIG. 4 represents an early-warning hose made up of inner hose, FIG, 3, and outer hose, FIG. 1.
Figure 5:
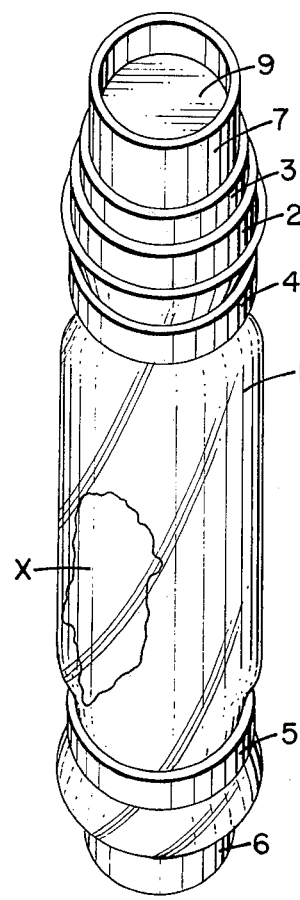
FIG. 5 represents an early-warning hose made up of an inner hose (3 of FIG. 3) an outer hose (1 of FIG. 1) and a middle ply of water or liquid absorbent, material. (2 of FIG. 2).

For experimental purposes, the bottom of the early warning hose is clamped to a closed tube at bottom and an open tube at the top and filled with water. Clamps are 4 and 5 of FIGS 4 and 5. Closed tube is 6 of FIGS. 4 and 5. Open tube is 7 of FIGS. 4 and 5. Water is 9 of FIGS. 4 and 5. 1 is the outer hose, FIGS. 1, 4, and 5. 3 is the inner hose, FIGS. 3, 4 and 5. 2 is the water or liquid absorbing material, FIGS 2 and 5. Finally, X of FIG. 3 represents the point where inner hose 3 is experimentally ruptured. Shaded area around X of FIGS. 4 and 5 represents the liquid that has spread in between inner hose 1 and outer hose 3. X of FIGS. 4 and 5 of course points to the rupture of inner hose 3. Said shaded area around X of FIGS. 4 and 5 is visible to the naked eye.

DETAILED DESCRIPTION

The operation of the early-warning hose is as follows: When there is a break at point X of 3 FIGS. 3, 4 and 5, water leaks into the space defined by the inner diameter of the outer hose (1 of FIGS. 4 and 5) and the outer diameter of the inner hose (3 of FIGS. 4 and 5). Since the water spreads throughout this space, and the outer hose serves as a window, this is very noticable to the naked eye. The outer hose of course at least temporarily contains the leak within the early-warning hose. The absorbent material 2 forming the middle ply of the early-warning hose in FIG. 5 makes it possible to make a better hose structure, but does not interfere with the seepage of water. Indeed, this makes it possible to bond all three plys (1, 2 and 3) together if the bonding is not carried so far as to render the absorbent material non-absorbent. Also, the middle ply (2 of FIG. 5) may be used as a reinforcement if its absorbing qualities are maintained.

Since there must be a provision for closing the ends of the outer hose and the inner hose together so that all seepage will be contained within the early warning hose, the early-warning hose must be clamped to its fitting. If the absorbent material extends to the clamp as in FIG. 5, it is rendered non-absorbent by being compressed. (A blotter may be used as a gasket if compressed). As with a conventional hose, the early-warning hose may be used with any appropriate hose fitting, but these must be a provision for clamping.

I claim:

1. An early warning hose comprising an inner hose of opaque material and a coaxially disposed outer hose of transparent of translucent material, the outer diameter of said inner hose being slightly smaller than the inner diameter of said outer hose to define a radial clearance, whereby liquid seeping from said inner hose will be visible through said outer hose.

2. A hose as in claim 1, further comprising an intermediate layer of liquid absorbent material disposed in said radial clearance between the inner and outer hose.

* * * * *